United States Patent [19]
Bolger

[11] 3,878,590
[45] Apr. 22, 1975

[54] SUSPENSION CLIP

[76] Inventor: Laurence L. Bolger, P.O. Box 116, Paicines, Calif. 95043

[22] Filed: Apr. 5, 1974

[21] Appl. No.: 458,297

[52] U.S. Cl. .................................. 24/261 C; 47/46
[51] Int. Cl. ...................... A01g 17/08; A44b 21/00
[58] Field of Search ...... 24/261 PT, 261 C, 261 DS, 24/261 G, 261 AC, 261 CT, 27; 47/44, 46, 47; 5/356

[56] References Cited
UNITED STATES PATENTS

| 2,103,955 | 12/1937 | Place | 5/356 |
| 2,851,823 | 9/1958 | Peterson | 47/47 |
| 3,302,328 | 2/1967 | King | 47/47 |

FOREIGN PATENTS OR APPLICATIONS

| 71,161 | 3/1959 | France | 24/261 G |
| 1,005,821 | 1/1952 | France | 47/47 |
| 209,103 | 5/1960 | Austria | 47/46 |
| 670,974 | 4/1952 | United Kingdom | 24/261 C |

Primary Examiner—Donald A. Griffin
Attorney, Agent, or Firm—Huebner & Worrel

[57] ABSTRACT

An improved suspension clip particularly suited for use by viticulturists in tying vines. The invention is characterized by a resilient body formed of a length of an elastic metallic wire and includes a pair of arcuate end portions of inverted U-shaped configurations adapted to receive a suspension wire, and an arcuate mid-portion conforming substantially to an incomplete annulus having a throat defined between said end portions for accommodating a reception of an arm of a grapevine. The body is responsive to manipulation for assuming a stressed configuration wherein the mid-portion defines a first closed loop for supporting an arm of a grapevine and the end portions thereof are disposed in an interfering, interlocking relationship and define a second closed loop for confining a suspension wire.

2 Claims, 5 Drawing Figures

PATENTED APR 22 1975          3,878,590

3,878,590

SUSPENSION CLIP

BACKGROUND OF THE INVENTION

The invention relates to suspension clips and more particularly to an improved suspension clip particularly suited for use in fastening arms of cardon grapevines to trellis wires, also herein referred to as suspension wires.

While the clip of the instant invention, as hereinafter described, has particular utility in the fastening of the arms of grapevines to suspension wires provided therefor, it is to be understood that the instant invention possesses utility in other than viticultural endeavors and can be employed in the fastening of a variety of masses to supporting members of a general nature.

As can readily be appreciated by viticulturists and others familiar with the art of producing grapes, a substantial amount of labor is required in tying grapevines to suspension wires extended between rigid posts and employed as a support for the grapevines. Frequently, in tying grapevines, the arms of a grapevine are fastened to a selected wire by simultaneously wrapping the arms and an adjacent suspension wire with lengths of tape, or similar tying devices. This technique, of course, is time consuming and is, therefor, expensive in terms of labor costs. Additionally, attempts have been made to fasten prefabricated clips to suspension wires so that canes of a grapevine can be inserted into the clips. These clips, normally, include a resilient throat through which the cane of a grapevine is forced without removing the clip from the wire. Unfortunately, substantial amounts of time are required in mounting the clips on the wires and, additionally, the canes can be removed from the clips in response to weight, vibration, and similar forces of the type to which grapevines frequently are subjected.

When employing devices of the type hereinbefore mentioned, it is common practice to cause the arms of grapevines to engage suspension wires and to secure the wires and the arms together in an engaged relationship. As a consequence, there is a distinct propensity for the arms to grow around the wires. Of course, the wires frequently are severed as the arms are removed therefrom with an attendant further increase in production costs.

It therefore is the general purpose of the instant invention to provide an improved, practical device for economically fastening grapevines and the like, with suspension wires and similar supports.

OBJECTS AND SUMMARY OF THE INVENTION

It is therefore an object of the instant invention to provide an improved suspension clip which overcomes the aforementioned disadvantages and difficulties.

It is another object to provide an improved suspension clip for use in fastening masses to supporting structures.

It is another object to provide an improved suspension clip for use by viticulturists in joining grapevines to suspension wires with a greater degree of security and at reduced costs.

It is another object to provide an improved, economic suspension clip for reducing costs in the pruning and tying of grapevines.

It is another object to provide a manipulatable suspension clip adapted to be disposed in circumscribing relationship with the arm of a grapevine, and expeditiously and securely fastened to a suspension wire with an attendant reduction in labor costs.

These and other objects and advantages are achieved through the use of an improved suspension clip which includes a resilient body formed from a length of metallic wire, preferably stainless steel wire, having a predetermined modulus of elasticity and including a pair of arcuate end portions, each being of an inverted U-shaped configuration and an arcuate mid-portion conforming substantially to an incomplete annulus having a throat defined between the end portions thereof for accommodating passage of the arm of a grapevine, said body being responsive to manually applied forces for assuming a stressed configuration wherein the mid-portion defines a closed loop circumscribing the arm of the grapevine, and the end portions are disposed in an interfering, interlocked relationship defining a second closed loop, adjacent said first closed loop, and circumscribing an adjacent suspension wire, as will hereinafter become more readily apparent by reference to the following description and claims in light of the accompanying drawings.

DESCRIPTION OF THE PREFERRED EMBODIMENT

Figure 1:
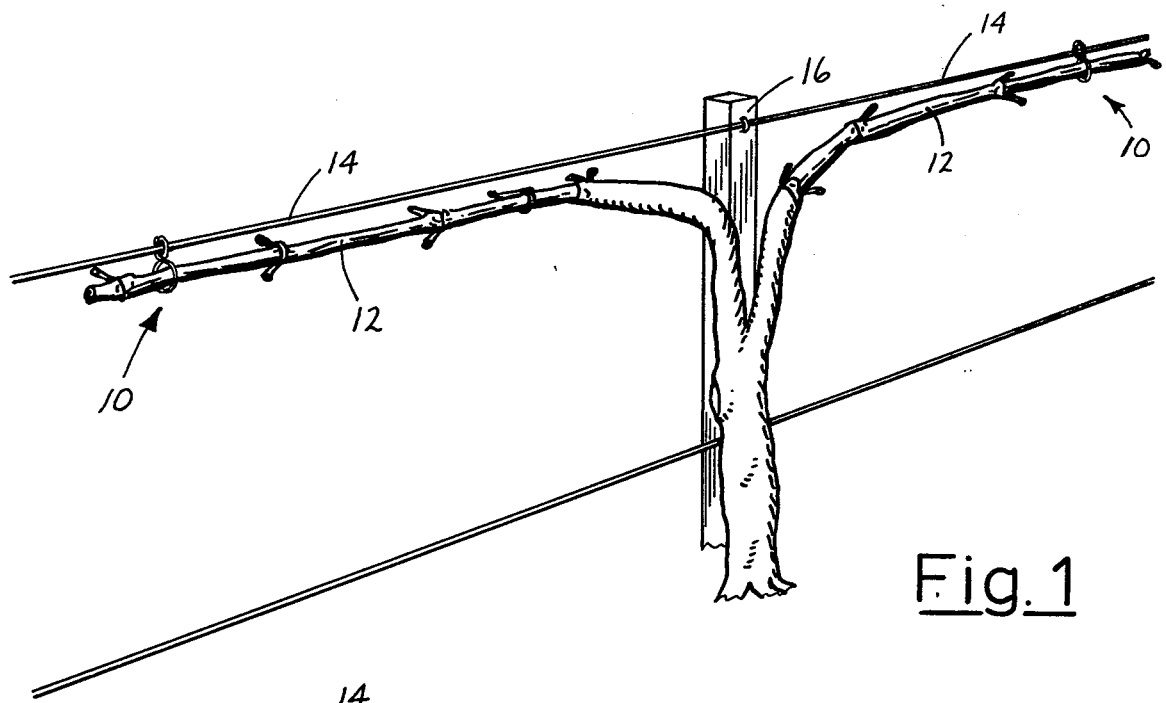
FIG. 1 is a pictorial view of a grapevine tied to suspension wires employing an improved clip which embodies the principles of the instant invention.

Referring now to the drawings wherein like reference characters designate like or corresponding parts throughout the several views, there is shown in FIG. 1 a clip, generally designated 10, which embodies the principles of the instant invention.

Figure 5:
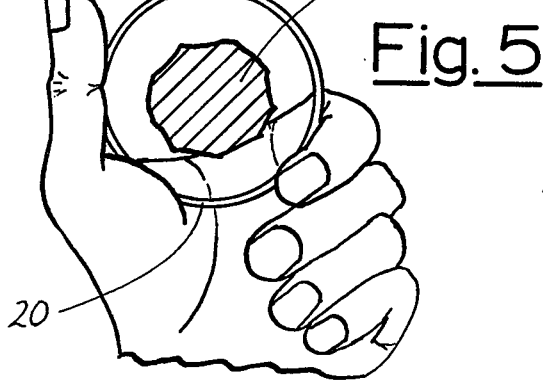
FIG. 5 is a pictorial view illustrating a technique for manipulating the clip shown in FIGS. 1 through 4.

As illustrated, the clip 10 is employed for tying arms 12 of a grapevine to a suspension wire 14 extended between posts 16, only one of which is illustrated. The clip 10 preferably is formed of a resilient metal, preferably of stainless steel, having a predetermined modulus of elasticity such that the clip can readily be deformed manually through a manipulation thereof, as illustrated in FIG. 5, for purposes of fastening the arm 12 to the vine 14.

Figure 3:
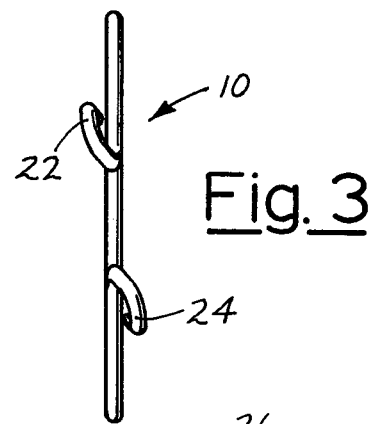
FIG. 3 is a top view of the clip shown in FIG. 2, but in a relaxed configuration.
Figure 4:
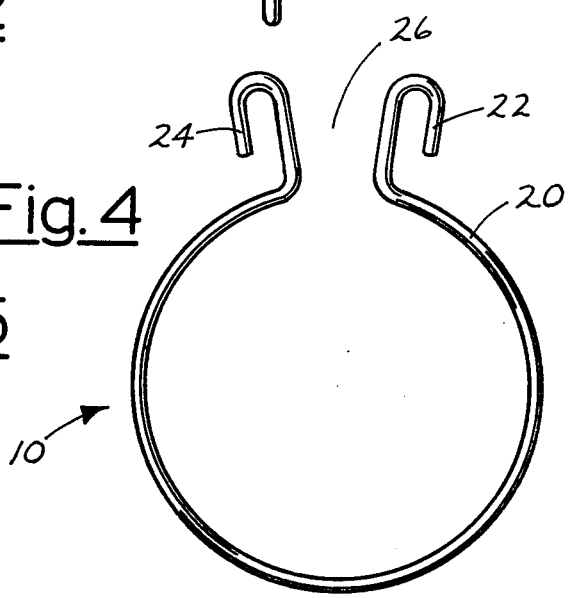
FIG. 4 is a side view of the clip in the relaxed configuration illustrated in FIG. 3.

As best shown in FIG. 4, the clip 10 includes a wire-like body having an arcuate mid-portion conforming substantially to an incomplete annulus, and a pair of arcuate end portions, designated 22 and 24. Between the end portions 22 and 24, when the clip 10 is in a relaxed configuration, there is defined an open throat 26 through which the arm 12 is inserted. It is important to note here that each of the end portions 22 and 24 is of a substantially inverted U-shaped configuration having one truncated leg and one leg integral with the mid-portion of the clip 10. As best illustrated in FIG. 3, the end portions 22 and 24 are disposed in intersecting planes angularly related to the plane of the mid-portion 20 of the clip. It will therefore be appreciated that the end portions 22 and 24 can be engaged in an interfering relationship, as illustrated in FIG. 2, simply by deforming the clip, through manipulation, to position the end portions one behind the other.

Figure 2:
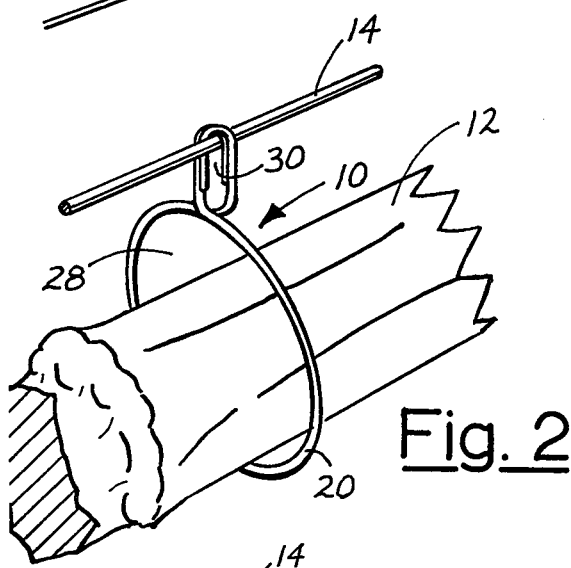
FIG. 2 is a fragmented view of a portion of the arm shown in FIG. 1.

The interfering relationship of the end portions 22 and 24 thus established serves to interlock the clip for supporting the clip 10 in a stressed condition wherein the clip includes a first closed loop, designated 28, FIG. 2, circumscribing the arm 12 of the grapevine, and a second closed loop, designated 30, circumscribing the suspension wire 14. Of course, once the end portions 22 and 24 are disengaged, through further manipulation, the clip 10 is conditioned to be returned to its relaxed configuration, illustrated in FIG. 4, so that the clip 10, arm 12, and suspension wire 14 are released for disassociation.

OPERATION

It is believed that in view of the foregoing description, the operation of the device will readily be understood and it will be briefly reviewed at this point.

As best illustrated in FIG. 5, the mid-portion 20 of the clip 10 is placed in partial circumscribing relation with a selected portion of an arm 12 of a selected grapevine. The mid-portion of the clip 10 is then deformed manually, by squeezing or applying oppositely directed forces to the mid-portion of the clip, in the plane thereof, to the extent that the positional relationships of the end portions 22 and 24 of the clip are reversed. While held in this condition, the clip 10 is elevated to a position such that the truncated leg end portions 22 and 24 pass above the plane of the wire 14 and to an elevation such that upon a release of the mid-portion of the clip 10 the resiliency of the clip 10 causes the end portions to be brought into an interfering interlocked relationship, as best illustrated in FIG. 2, whereby the clip is supported in a stressed condition. In this condition the mid-portion 20 defines a closed loop 28 circumscribing the arm 12 while the end portions 22 and 24 define a closed loop circumscribing the wire 14.

In view of the foregoing, it should readily be apparent that the clip 10 which embodies the principles of the instant invention is particularly suited to be employed in tying the arms of the grapevines and the like to suspension wires and similar supports with minimal labor costs.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letter Patent is:

1. An improved suspension clip particularly adapted for use in releasibly connecting grapevines to trellis wires comprising:

a stressed, resilient body including a midportion of a closed-loop configuration having a substantially circular circumference and substantially lying in a first plane for supporting a mass, such as an arm of a grapevine circumscribed thereby, and a pair of overlapped and interlocked end portions lying in intersected second and third planes angularly related to said first plane defining a closed loop adjacent to said mid-portion of a closed-loop configuration for confining a support, such as a trellis wire, each end portion of said pair of end portions being of a substantially inverted U-shaped configuration and characterized by a base leg integral with said body and a distal leg integral with the base leg and arranged in a mutually spaced, parallel relationship therewith, and having one end disposed in spaced relation with the circumference of said midportion for defining therebetween a throat through which passage of said support is facilitated within which the base leg of the other end portion of said pair of end portions is received.

2. An improved suspension clip for supporting a given mass, such as an arm of a grapevine, in suspension from an elevated support, such as a trellis wire, comprising:

a resilient body including a pair of mutually displaceable, interlockable end portions lying in first and second intersected planes and a midportion of an arcuate configuration lying in a third plane angularly related to said first and second planes conforming substantially to an incomplete annulus having an opening defined between said end portions for accommodating passage of a given mass, such as an arm of a grapevine, each end portion of said pair being of a substantially inverted U-shaped configuration and characterized by a base leg integral with said body and a distal leg integral with said base leg and arranged in a mutually spaced parallel relationship therewith and having one end disposed in spaced relation with the circumference of said midportion for defining therebetween a throat, said body being responsive to coplanar forces oppositely applied thereto for assuming a stressed condition wherein said midportion is caused to define a first closed loop and the throats of the end portions are disposed in an opposed relationship for accommodating simultaneous passage therethrough of a support, such as a trellis wire, said end portions being displaceable from said opposed relationship, upon removal of said forces, in response to the stressed condition of said body into an interlocked relationship established as the base leg of each end portion of said pair of end portions is received within the throat of the opposite end portion for thereby defining a second closed loop adjacent to said first closed loop.

* * * * *